(12) United States Patent
Schreiber (10) Patent No.: US 11,248,985 B2
(45) Date of Patent: Feb. 15, 2022

(54) PRODUCTION METHOD AND PRODUCTION SYSTEM THAT DETECT THE INTEGRITY OF THE HERMETIC SEAL OF A CONTAINER CONTAINING A PRODUCT

(71) Applicant: Eugene Schreiber, Brooklyn, NY (US)

(72) Inventor: Eugene Schreiber, Brooklyn, NY (US)

( * ) Notice: Subject to any disclaimer, the term of this patent is extended or adjusted under 35 U.S.C. 154(b) by 80 days.

(21) Appl. No.: 16/786,414

(22) Filed: Feb. 10, 2020

(65) Prior Publication Data
US 2020/0264069 A1   Aug. 20, 2020

Related U.S. Application Data

(60) Provisional application No. 62/806,007, filed on Feb. 15, 2019.

(51) Int. Cl.
| | |
|---|---|
| *G01M 3/36* | (2006.01) |
| *G01B 11/24* | (2006.01) |
| *B65G 39/10* | (2006.01) |
| *G01B 11/25* | (2006.01) |
| *B65G 35/00* | (2006.01) |
| *B65G 43/08* | (2006.01) |

(52) U.S. Cl.
CPC ............ *G01M 3/36* (2013.01); *B65G 39/10* (2013.01); *G01B 11/24* (2013.01)

(58) Field of Classification Search
CPC .......... G01M 3/36; G01B 11/24; G01B 11/25; B65G 39/10; B65G 43/08; B65G 2203/0208; B65G 2201/0235
See application file for complete search history.

(56) References Cited

U.S. PATENT DOCUMENTS

| | | | | | |
|---|---|---|---|---|---|
| 3,164,289 | A | * | 1/1965 | Cocchiarella | B65D 43/26 220/578 |
| 4,899,574 | A | * | 2/1990 | Potteiger | G01M 3/363 73/49.3 |
| 4,934,180 | A | * | 6/1990 | Huisman | G01M 3/366 73/49.3 |
| 5,105,654 | A | * | 4/1992 | Maruyama | G01M 3/363 73/49.3 |
| 5,156,329 | A | * | 10/1992 | Farrell | B29C 65/8246 220/359.3 |
| 5,239,859 | A | * | 8/1993 | Lehmann | B07C 5/3408 73/49.2 |
| 5,365,774 | A | * | 11/1994 | Horlacher | G01M 3/363 73/45.4 |
| 6,014,883 | A | * | 1/2000 | McClung | B21D 22/22 72/347 |

(Continued)

*Primary Examiner* — Bayan Salone
(74) *Attorney, Agent, or Firm* — Ostrolenk Faber LLP (57) ABSTRACT

A production method and system performing the production method, the method includes detecting integrity of a hermetic seal of a container that is being transported by a conveyor, the container including an elastically deformable cup containing a product and a fluid, and having an open mouth and a deformable lid attached around the open mouth of the cup, the detecting including squeezing the cup to pressurize the fluid contained in the container; and determining with a detector whether the squeezing caused the lid to deform; and when it is determined that the squeezing failed to deform the lid, removing the container from the conveyor.

17 Claims, 6 Drawing Sheets

(56) References Cited

U.S. PATENT DOCUMENTS

| | | | | |
|---|---|---|---|---|
| 6,167,750 B1 * | 1/2001 | Lehmann | ............ | G01M 3/3236 |
| | | | | 73/49.3 |
| 6,244,091 B1 * | 6/2001 | McClung | ............... | B21D 22/22 |
| | | | | 72/347 |
| 6,345,527 B1 * | 2/2002 | Lehmann | ............ | G01M 3/3281 |
| | | | | 73/49.2 |
| 6,446,493 B1 * | 9/2002 | Lehmann | .............. | G01M 3/329 |
| | | | | 73/49.3 |
| 7,624,623 B2 * | 12/2009 | Mayer | .................. | G01M 3/3272 |
| | | | | 73/195 |
| 9,274,023 B2 * | 3/2016 | Chevalier, Jr. | ........... | G01M 3/36 |
| 10,421,565 B2 * | 9/2019 | Fu | ............................... | G01L 9/06 |
| 11,125,390 B2 * | 9/2021 | Gehlhausen | ............. | B65D 7/22 |
| 2018/0327150 A1 * | 11/2018 | Maldonado | ........ | B65D 83/0094 |
| 2019/0137037 A1 * | 5/2019 | Gehlhausen | ............. | B65D 7/06 |

* cited by examiner

PRODUCTION METHOD AND PRODUCTION SYSTEM THAT DETECT THE INTEGRITY OF THE HERMETIC SEAL OF A CONTAINER CONTAINING A PRODUCT

CROSS-REFERENCE TO RELATED APPLICATIONS

The present application claims priority to U.S. Provisional Application Ser. No. 62/806,007, filed Feb. 15, 2019, the entire disclosure of which is incorporated by reference herein.

FIELD OF INVENTION

The disclosed invention relates to a packaging method and, in particular, to a method and a system for ensuring the the hermeticity of a container containing a spoilable, degradable, or perishable product such as an ingestible product (e.g. foodstuff).

BACKGROUND

Figure 1:
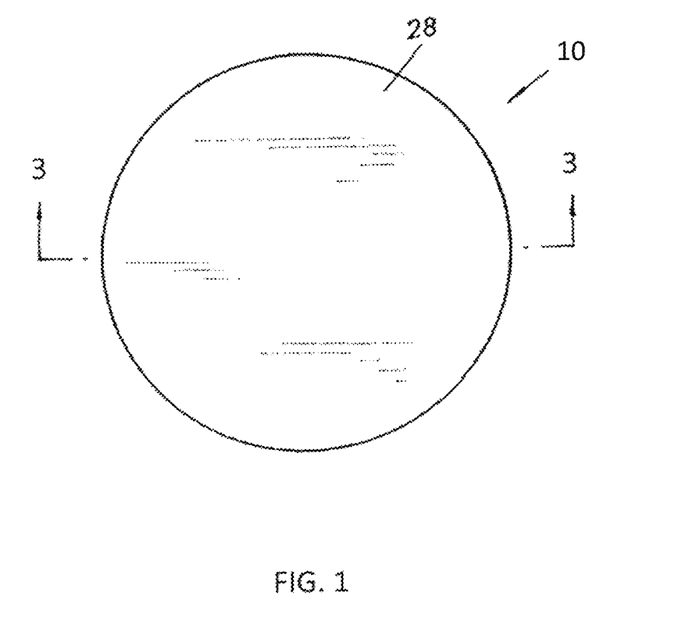
FIG. 1 illustrates a top plan view of a hermetically sealed container.
Figure 2:
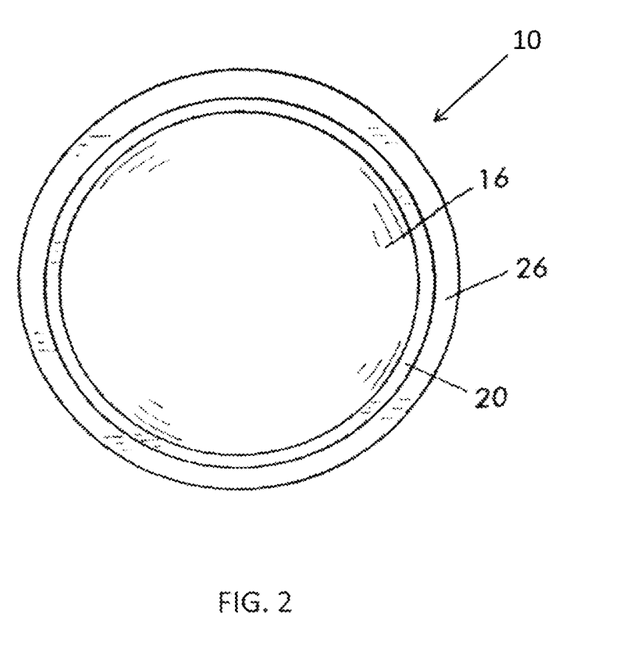
FIG. 2 illustrates a bottom plan view of the container of FIG. 1.
Figure 3:
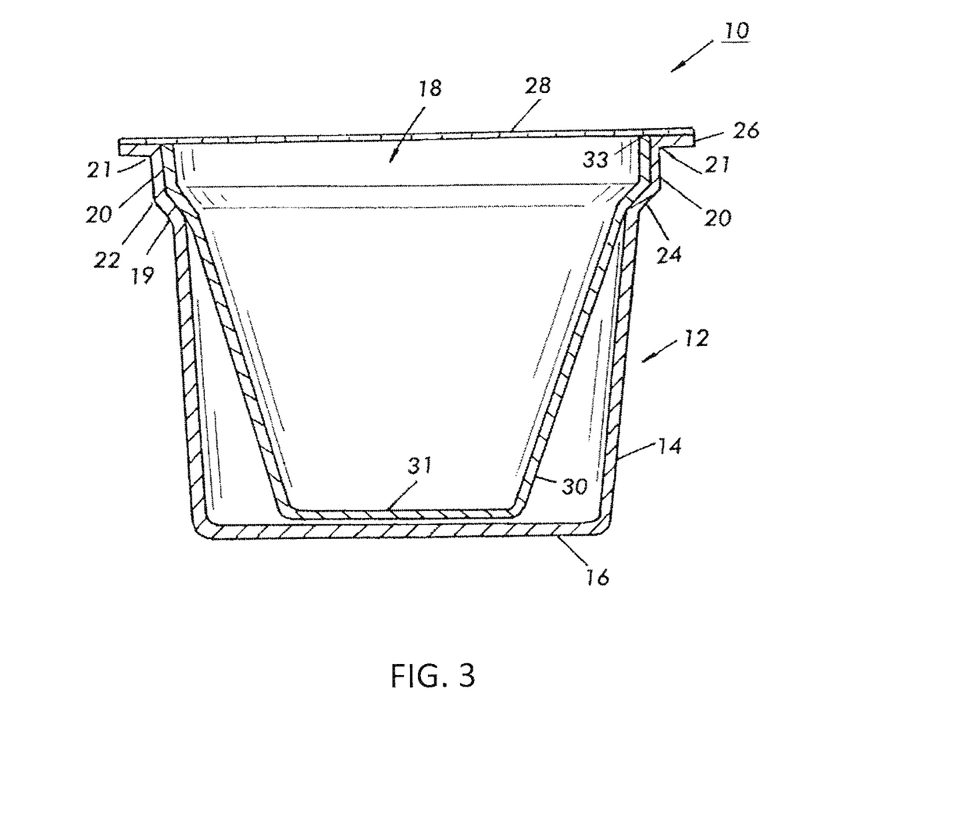
FIG. 3 illustrates a cross-sectional view of the container of FIGS. 1 and 2 along line 3-3 in FIG. 1 and viewed in the direction of the arrows.

FIGS. 1-3 show a hermetically sealed container (specifically a cartridge) 10 that is configured to contain, for example, an ingestible product (e.g. coffee).

Referring to FIG. 3, the cup 12 of the container 10 includes a frustoconical bottom portion 14 having a closed bottom 16 and an open top 18 defined by a top edge 19. An endless, annular wall 20, which may be cylindrical, is joined at its bottom edge 22 to the edge 19 of the frustoconical bottom portion 14 via an intermediate, endless, annular, flange portion 24. The intermediate flange portion 24 extends away from the interior of frustoconical bottom portion 14 and surrounds the top edge 19 of the frustoconical bottom portion 14 and its top edge 19. The annular wall 20 terminates at a top edge 21, which defines the open mouth of the cup 12. The top edge 21 is joined with a top flange 26 that extends away from the interior of the annular wall 20 in a radial direction. A lid (e.g. a metallic foil) 28 is joined with the top flange 26. A cup shaped filter 30 extends from the top edge 21 of the annular wall 20 to a depth less than the depth of cup 12, whereby the bottom 31 of the filter 30 is spaced from closed bottom 16 of the cup 12. A portion of the filter 30 extending from its top edge 33 is directly joined to an interior surface of the annular wall 20 as illustrated in FIG. 1.

The container 10 shown in FIGS. 1-3 has been used as packaging for coffee and is configured for use with coffee making machines.

To avoid spoilage or degradation of the product (e.g. coffee) contained in the container 10, and to keep the product fresh, foil 28 must be joined with the cup 12 to form a hermetic seal. Thus, it is important to ensure that the foil 28 and the cup 12 are joined properly.

SUMMARY OF THE INVENTION

A method of production according to the present invention includes detecting the integrity of a hermetic seal of a container that is being transported by a conveyor, the container including an elastically deformable cup containing a product (for example coffee) and a fluid (for example, gas), and having an open mouth and a deformable lid attached around the open mouth of the cup, the detecting including squeezing the cup to pressurize the fluid contained in the container, and determining with a detector whether the squeezing caused the lid to deform; and, when it is determined that the squeezing failed to deform the lid, removing the container from the conveyor.

The squeezing may be performed by transporting the container between two rollers spaced far enough to cause bulging of the lid outwardly for the detector to detect the bulging of the lid.

The detector may include a laser projector and a laser detector, and the container may be transported to pass under the laser projector during the squeezing.

In one embodiment, the detector may send no signal when the lid is bulging.

The detector may be a laser profile scanner programmed to determine whether the lid has bulged to have a dome.

The container may be removed by blowing air toward the container with a blower.

The conveyor may be a belt conveyor, and the method may further include directing the container toward the spaced rollers with a belt and pulley system.

A production system according to the present invention includes a conveyor to transport a container having an elastically deformable cup containing a product (for example, coffee) and a fluid (for example, gas), an open mouth and a deformable lid attached around the open mouth of the cup; a hermetic seal detection station that includes two spaced bodies at said conveyor arranged to squeeze the cup of the container as the container passes between the two spaced bodies; and a detector to detect deformation of the lid of the container due to being squeezed.

The two spaced bodies may be rollers spaced far enough to cause bulging of the lid outwardly and the detector detects the bulging of the lid.

The detector may include a laser projector and a laser detector, and the laser projector may be arranged to have the container pass under the laser projector during the squeezing.

In one embodiment, the detector sends no signal when the lid is bulging.

The detector may be a laser profile scanner programmed to determine whether the lid has bulged to have a dome.

The system may further include a blower to blow air toward the container when the detector does not detect a bulge.

The conveyor may be a belt conveyor, and the system may further include a belt and pulley system to direct a container toward the spaced rollers.

DETAILED DESCRIPTION

In a method according to the present invention, a spoilable, degradable or perishable product (e.g. an ingestible product, such as coffee) is deposited inside of a cup 12 (see FIGS. 1-3). Thereafter, a lid 28 (e.g. a metallic foil) is placed over the open mouth of the cup 12 to close the open mouth of the cup. Thus, for example, the lid 28 may be placed in contact with the flange 26 portion of the cup 12 (if the cup 12 has a flange). Thereafter, the lid 28 is joined with the cup 12 (e.g. flange 26) to form a hermetic seal in order to prevent air from escaping, or entering into, the interior of the cup 12. The lid 28 may be joined with the cup 12 in any known manner. For example, an adhesive may be used to join the lid 28 with the cup 12. In one embodiment, the cup 12 is filled with coffee and nitrogen to displace the air (oxygen) in the coffee-filled cup to flush out the oxygen. Then, an aluminum lid 28 is heat sealed to the coffee-filled cup 12. The joining step to join the lid 28 with the cup 12 must result in a hermetically sealed container 10. Thus, after the joining step, the hermeticity of the container 10 needs to be verified.

According to the present invention, the cup 12, which is made out of a flexible, elastically deformable material such as a plastic, is squeezed to elastically deform the cup 12 and pressurize the air therein. The squeezing pressure applied to the cup 12 is selected to be high enough to cause the lid 28, which is made of a deformable material (e.g. a metallic foil) to bulge outwardly and form a dome. The pressure, however, must not be high enough to either damage the cup 12 or break the joint between the lid 28 and the cup 12. The pressure range for squeezing the cup 12 to cause the bulging of the lid 28 can be devised experimentally. In one embodiment after the sealing step which follows the nitrogen flush, the sealed cup 12 should have some gas pressure therein. Thus, squeezing the coffee-filled and sealed cup 12 should cause the bulging of the aluminum lid 28 if a hermetic seal was attained.

Figure 4:
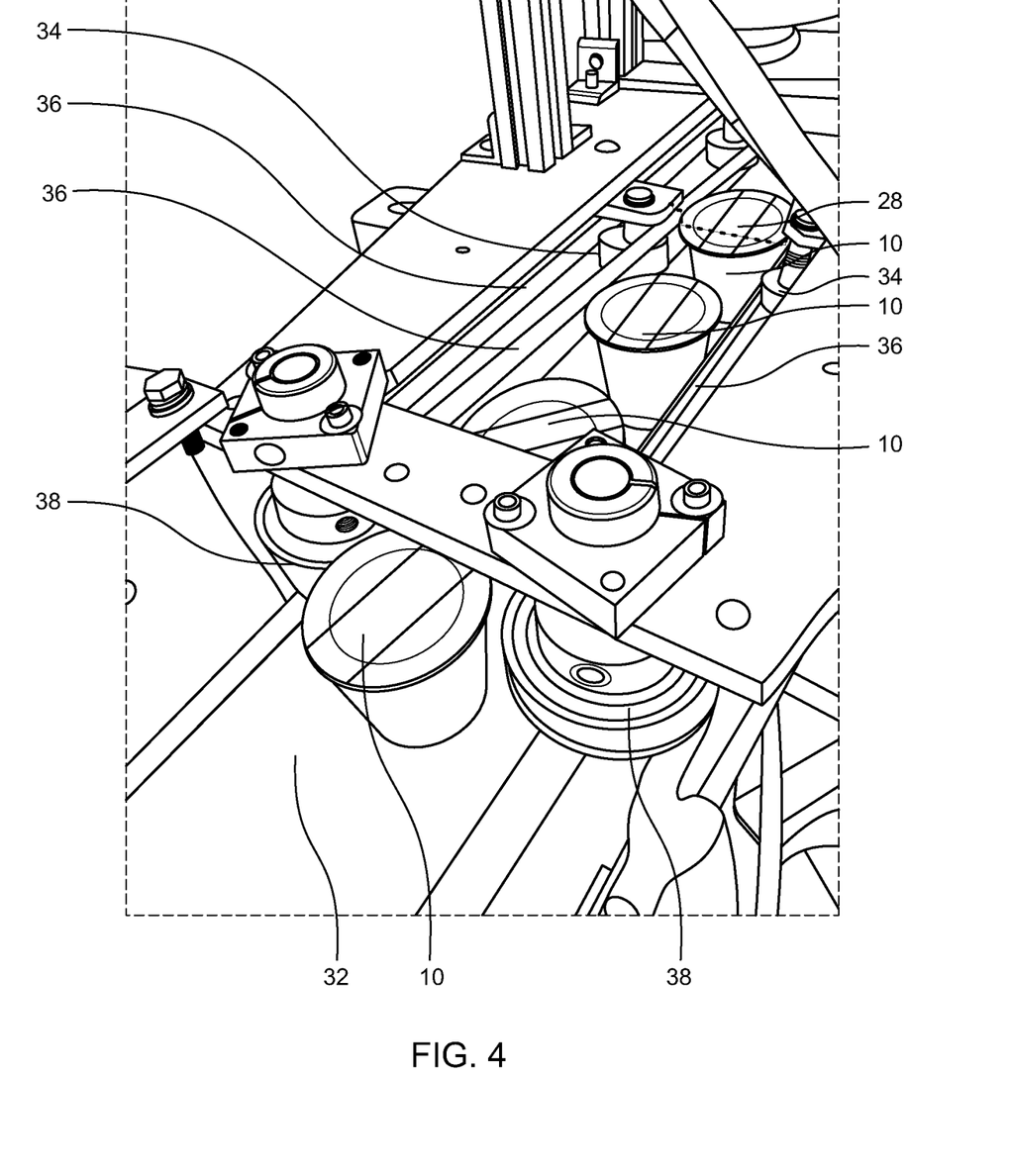
FIGS. 4-6 illustrate an embodiment of the present invention with FIG. 4 showing containers being transported toward a seal integrity detecting station, FIG. 5 showing containers being transported through a seal integrity detection station that includes two squeezing rollers and a laser detector, and FIG. 6 showing containers exiting the seal integrity detection station and being transported past a blower located along the conveyor.
Figure 5:
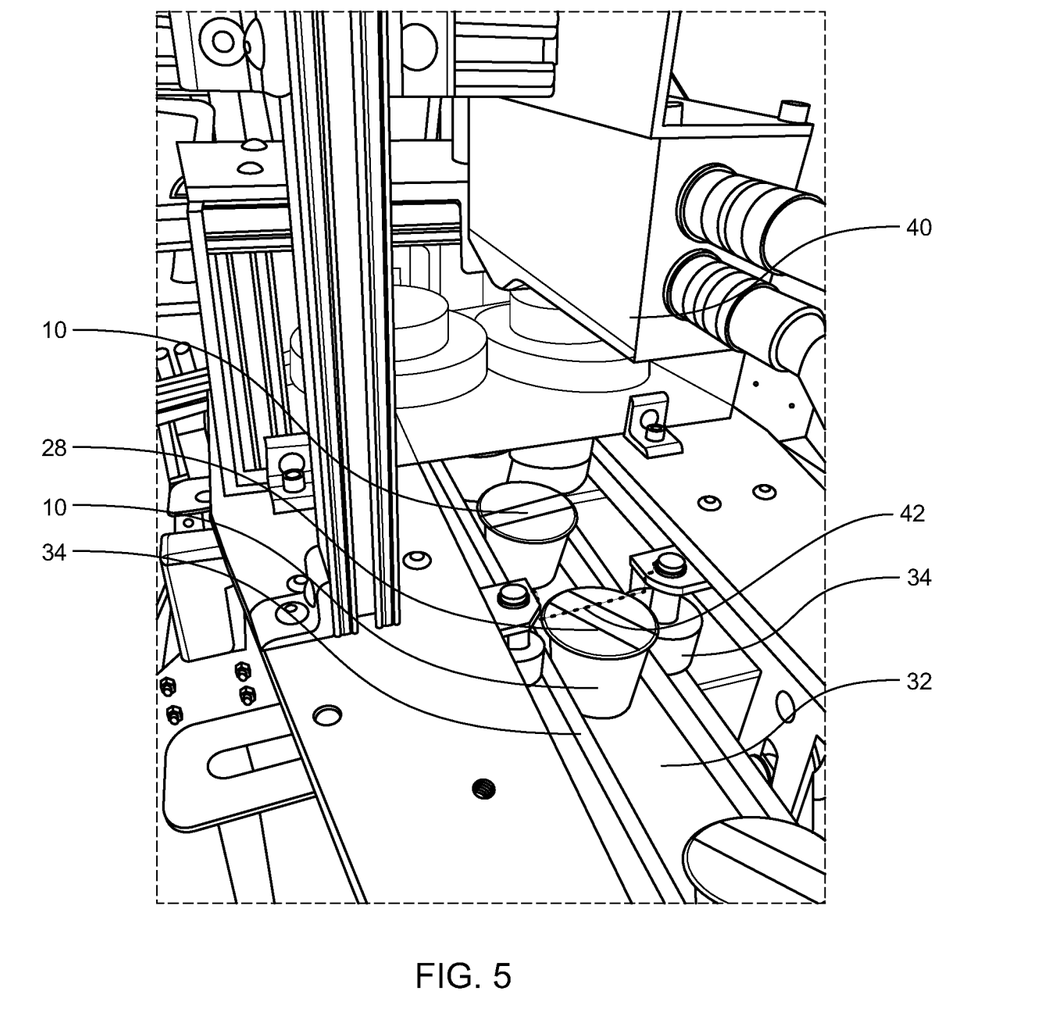
Figure 6:
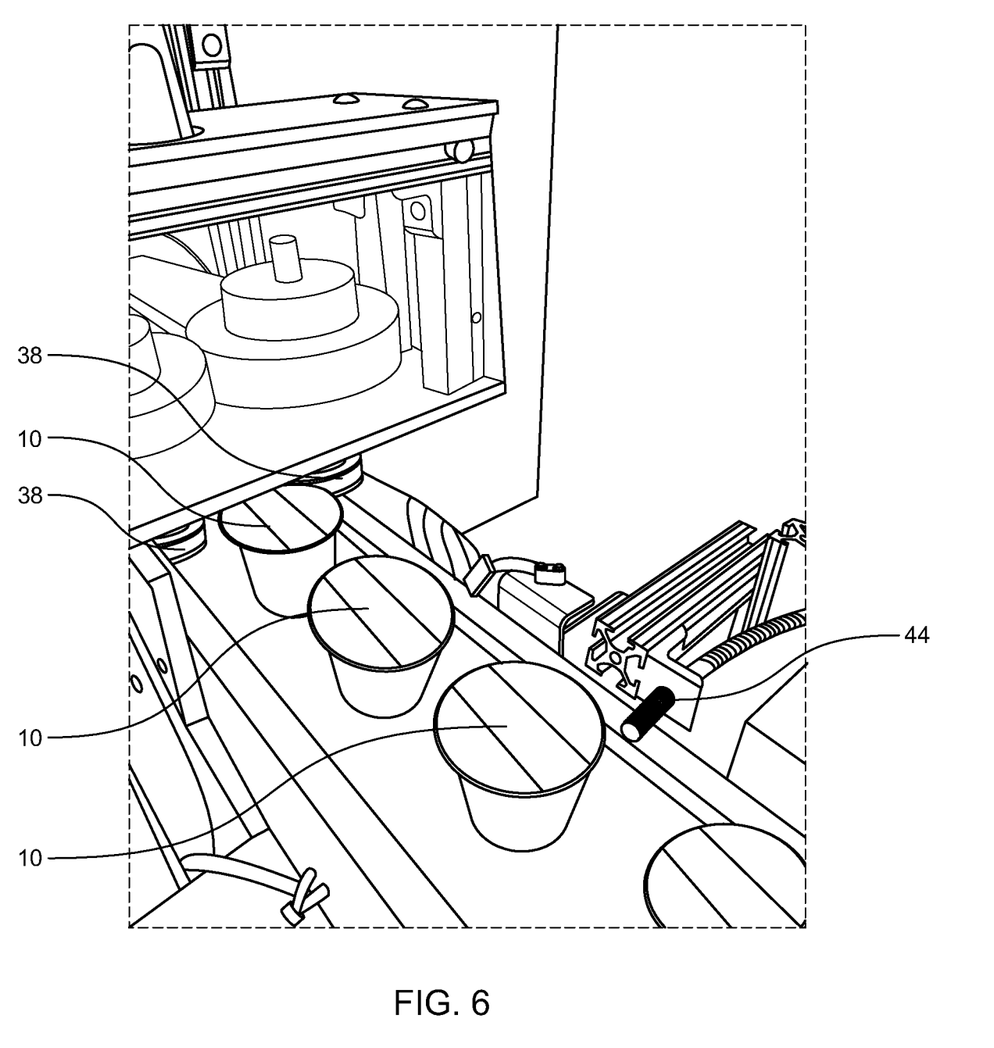

Referring to FIGS. 4-6, according to one embodiment of the pressure invention, in order to squeeze the cup 12, the cup 12 is transported on a conveyor belt 32 between two squeezing rollers 34, for example. A belt and pulley aligner (comprising a belt 36 and a pulley 38 system provided on each side of the path of the containers 10) is provided to properly position the containers 10 under a detector (described below). The containers 10 are aligned by the belts 36 of the belt 36 and pulley 38 systems toward the squeezing station where the squeezing rollers 34 are located, each roller 34 being positioned behind a respective belt 36 of a respective belt 36 and pulley 38 system. In one embodiment, the squeezing rollers 34 are spaced far enough to pressurize the gas in the sealed cup 12 to cause the bulging of the aluminum lid 28 which is sealed to the coffee-filled (and nitrogen-filled) and sealed cup 12 if the cup is hermetically sealed.

According to the present invention, while the cup 12 is being squeezed, a detector 40 checks to determine whether the lid 28 is bulging outwardly (see FIG. 5). According to one embodiment, the detector 40 includes a laser projector and a laser detector combination. The detector 40 is positioned so that the laser projector projects a light 42 toward the lid 48 as the container 10 passes under the laser projector while being squeezed by squeezing rollers 34. If the lid 28 bulges due to the squeezing, then the laser detector 40 sends no signal and the container 10 continues to be transported by the conveyor belt 32 toward the next stage. For example, the next stage may involve boxing the containers 10.

If the laser detector 40 does not detect a bulging lid 28 while the container 10 is being squeezed by the rollers 34, then the container 10 is removed from the conveyor belt 32.

In one embodiment, the detector 40 is a laser profile scanner, which is a well-known device for acquiring the surface topography of a workpiece. The scanner may be programmed to have programmed parameters to determine whether the sealed aluminum lid 28 has bulged to have a dome.

In one embodiment, to remove a container 10 from the conveyor belt 32, a blower 44 is installed downstream of the laser detector 40. If the laser detector 40 (e.g. the laser profile scanner) does not detect a bulging lid 28 as the container 10 passes under the laser detector 40 while being squeezed by rollers 34, a signal is sent from the detector 40 to a controller (not shown) that operates the blower 44 to blow air toward the container 10 with a velocity high enough to cause the container 10 to be thrown off the conveyor belt 32 into, for example, a garbage bin located adjacent the conveyor belt 32. In order to effect the removal, the blower 44 may be installed after the laser detector 40, after the belt 36 and pulley 38 systems (i.e. after the containers exist the belt and pulley aligner), and after the squeezing rollers 34. Thus, once the blower controller receives a signal from the detector 40, it blows air at the next container 10 that exits the belt and pulley aligner.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of production, comprising:
   detecting integrity of a hermetic seal of a container that is being transported by a conveyor, the container including an elastically deformable cup containing a product and a fluid, and having an open mouth and a deformable lid attached around the open mouth of the cup, the detecting including squeezing the cup to pressurize the fluid contained in the container, and determining with a detector whether the squeezing caused the lid to deform; and
   when it is determined that the squeezing failed to deform the lid, removing the container from the conveyor.

2. The method of claim 1, wherein the squeezing is performed by transporting the container between two rollers.

3. The method of claim 2, wherein the two rollers are spaced far enough to cause bulging of the lid outwardly and the detector detects the bulging of the lid.

4. The method of claim 3, wherein the detector includes a laser projector and a laser detector, and the container passes under the laser projector during the squeezing.

5. The method of claim 4, wherein the detector sends no signal when the lid is bulging.

6. The method of claim 5, wherein the detector is a laser profile scanner.

7. The method of claim 6, wherein the laser profile scanner is programmed to determine whether the lid has bulged to have a dome.

8. The method of claim 7, wherein the container is removed by blowing air toward the container with a blower.

9. The method of claim 8, wherein the conveyor is a belt conveyor, and further comprising directing the container toward the spaced rollers with a belt and pulley system.

10. A production system, comprising:
    a conveyor to transport a container having an elastically deformable cup containing a product and a fluid, an open mouth and a deformable lid attached around the open mouth of the cup;

a hermetic seal detection station that includes two spaced bodies at said conveyor arranged to squeeze the cup of the container as the container passes between the two spaced bodies; and a detector to detect deformation of the lid of the container due to being squeezed.

11. The system of claim 10, wherein the two spaced bodies are rollers spaced far enough to cause bulging of the lid outwardly and the detector detects the bulging of the lid.

12. The system of claim 11, wherein the detector includes a laser projector and a laser detector, and the laser projector is arranged to have the container pass under the laser projector during the squeezing.

13. The system of claim 12, wherein the detector sends no signal when the lid is bulging.

14. The system of claim 13, wherein the detector is a laser profile scanner.

15. The system of claim 14, wherein the laser profile scanner is programmed to determine whether the lid has bulged to have a dome.

16. The system of claim 11, further comprising a blower to blow air toward the container when the detector does not detect a bulge.

17. The system of claim 16, wherein the conveyor is a belt conveyor, and further comprising a belt and pulley system to direct a container toward the spaced rollers.

* * * * *